June 11, 1929.  J. E. JOHNSON ET AL  1,716,445
LABELING MACHINE DISCHARGE AND EDGE STICKING ATTACHMENT
Filed Sept. 29, 1927
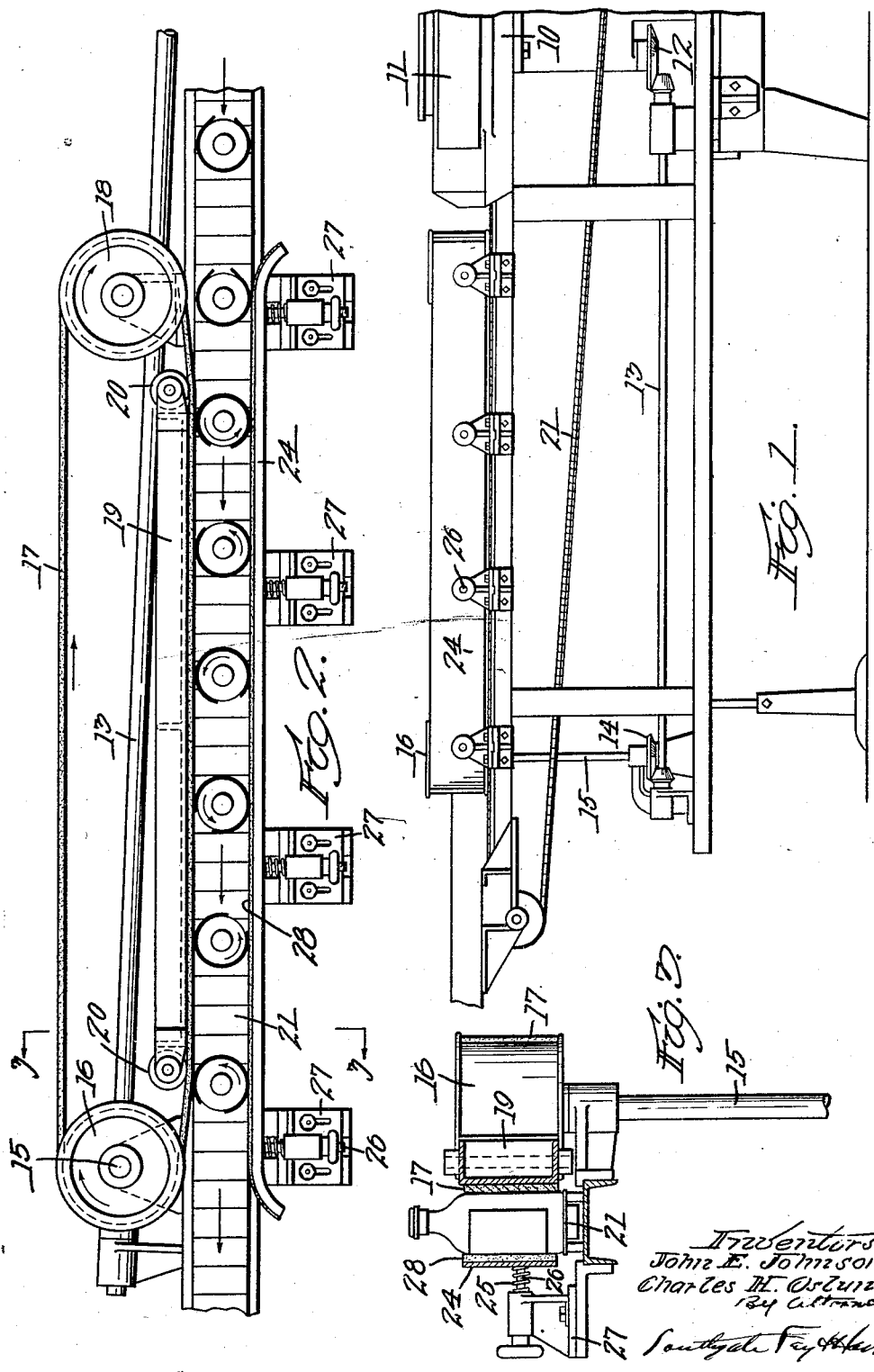

Patented June 11, 1929.

1,716,445

UNITED STATES PATENT OFFICE.

JOHN E. JOHNSON AND CHARLES H. OSLUND, OF WORCESTER, MASSACHUSETTS, ASSIGNORS TO THE O & J MACHINE COMPANY, OF WORCESTER, MASSACHUSETTS, A CORPORATION OF MASSACHUSETTS.

LABELING-MACHINE DISCHARGE AND EDGE-STICKING ATTACHMENT.

Application filed September 29, 1927. Serial No. 222,889.

This invention relates to an attachment for a labeling machine by which the bottles, jars, cans or other articles that have been labeled are given a motion, during their discharge from the labeling machine proper, to thoroughly stick down the free edges of the labels during the process of discharge.

The invention involves the discharge conveyor for taking the labeled articles away from the labeling machine and means along the conveyor for turning the articles on their own axes as they move and wiping down the edges of the labels by that means.

Reference is to be had to the accompanying drawings in which

Fig. 1 is a side view of the discharge side of a labeling machine and of a preferred form of this attachment applied thereto;

Fig. 2 is a plan of the same, and

Fig. 3 is a sectional view on the line 3—3 of Fig. 2.

This invention is adapted to be applied to a labeling machine which discharges its labeled articles automatically by means of a conveyor and is particularly applicable to the rotary table type of machine. It sometimes happens that when the articles have been supplied with the labels almost or entirely around the same there will be a few of these articles in which the vertical edges of the labels will fail to be pressed down firmly against the surface of the article. This leaves an edge sticking up and, if it is allowed to remain there until the paste dries, it leaves a faulty article. Sometimes this fault will not be detected by ordinary inspection because the free edge of the label will be located normally in its place but not stuck firmly to the article. This invention is designed to stick down such edges.

This invention is shown as applied to a labeling machine having a rotary table 10 and a rotary discharge turret 11. The means for operating the rotary table are not shown but connected with that means is the vertical shaft for the turret, having a gear 12. This gear meshes with a pinion on a shaft 13 which also has another pinion meshing with a gear 14 on a vertical shaft 15. The two pinions are shown as of substantially the same size and the gear 12 as having twice as many teeth as the gear 14. Therefore the shaft 15 rotates at twice the speed of the shaft which runs the discharge turret 11.

The shaft 15 is provided with a pulley 16 at the top having a rubber or leather belt 17 running over another pulley 18 which is mounted to rotate freely on its shaft. This belt on its operative side runs over a guide 19 having free rollers 20 on its opposite ends to deflect it slightly out of its path toward the conveyor as will appear. This furnishes a firm support back of the belt.

By the discharge turret 11 articles are taken from the table 10 and placed on a conveyor 21 which is a part of the usual rotary table labeling machine. This conveyor runs at the speed of the machine and at the speed at which the articles are discharged on it by the discharging turret 11. The strand of the belt 17 which is deflected by the guide 19 is located on one side of this conveyor. Along the other side is a plate 24 which is provided with a rubber facing 28. This plate is substantially stationary but is held yieldingly forward by springs 25 on pins 26. These pins are located on adjustable brackets 27 so this member will yield slightly and can be adjusted to different sized articles guided along the conveyor 21. The springs force this plate against the articles with a yielding pressure.

In the operation of the device, the articles to be labeled are deposited on the conveyor by the discharge turret and this conveyor takes them along to the discharge point at this uniform speed. The belt 17 running in the direction of the arrow, and its strand which extends over the conveyor running at twice the speed of the conveyor on account of the arrangement above described, rotates the articles on their own axis as they are moved along on the conveyor. This will be obvious from the fact that these articles are in contact with the plate 24 on one side and the belt 17 on the other which moves faster than the conveyor. This rotary movement obviously will force down any projecting vertical edges of the labels by their rolling contact with the soft surfaces 17 and 28. This completes the labeling operation.

There is not much wear on the facing 28 as it is located on a stationary plate and the articles roll along the surface thereof and do not slide over it. This constitutes a simple addition to the mechanism already present on a labeling machine for accomplishing the finishing of the labeling operation while the articles are being discharged and without increasing the length of the discharge conveyor or apron and without adding much to the expense. The invention can be applied to various types of labeling machines.

Although we have illustrated and described only one form of the invention we are aware of the fact that modifications can be made therein by any person skilled in the art without departing from the scope of the invention as expressed in the claims.

Therefore, we do not wish to be limited in these respects but what we do claim is:

1. The combination with a labeling machine and an endless apron conveyor arranged to receive the labeled articles therefrom and constitute the sole means for supporting them, of means moving along the conveyor for turning the articles on their own axes as they move along with the conveyor.

2. The combination with a rotary labeling machine having a turret for discharging the labeled articles and a discharge conveyor running at the speed of the turret for receiving the articles therefrom, of a belt having a strand movable along the side of the conveyor with it, and means connected with the labeling machine for running the belt at a higher speed than the conveyor, for the purpose described.

3. In a discharge conveyor for a labeling machine, the combination with an endless belt for receiving the articles thereon, of a substantially stationary plate extending along one side thereof, a belt having a strand parallel with said plate along the other side, and means operated by the labeling machine for moving the belt faster than the conveyor, whereby the articles to be labeled will be rolled along said plate by the action of the belt while being carried along by the conveyor.

4. In a discharge device for a labeling machine, the combination with a conveyor adapted to receive and discharge the articles, of a plate located along one side of the conveyor for engagement with the articles on the conveyor, and an endless belt located along the other side of the conveyor and having a strand parallel with said plate and projecting over the conveyor into contact with the labeled articles.

5. In a discharge conveyor for a labeling machine, the combination with an endless apron for receiving the articles thereon, of a substantially stationary plate extending along one side thereof, and a belt having a strand parallel with said plate along the other side, the plate being so located that the articles are in contact with it and with the belt.

In testimony whereof we have hereunto affixed our signatures.

JOHN E. JOHNSON.
CHARLES H. OSLUND.